United States Patent [19]
Cluzel

[11] 4,160,230
[45] Jul. 3, 1979

[54] ACOUSTIC ANTENNA

[75] Inventor: Philippe H. Cluzel, Six-Fours-Les-Plages, France

[73] Assignee: Etat Francais, France

[21] Appl. No.: 767,293

[22] Filed: Feb. 10, 1977

[30] Foreign Application Priority Data

Mar. 8, 1976 [FR] France ............ 76 06457

[51] Int. Cl.² ............ H04B 13/00
[52] U.S. Cl. ............ 340/9; 340/10
[58] Field of Search ............ 340/8 FT, 8 R, 9, 10, 340/11, 12, 13

[56] References Cited

U.S. PATENT DOCUMENTS

| | | | |
|---|---|---|---|
| 2,438,925 | 4/1948 | Krantz | 340/9 X |
| 2,515,154 | 7/1950 | Lanphier | 340/9 |
| 3,277,428 | 10/1966 | Sampsell | 340/9 X |
| 3,393,400 | 7/1968 | Trott | 340/8 R |
| 3,901,352 | 8/1975 | Cluzel | 340/8 FT |

*Primary Examiner*—Harold J. Tudor
*Attorney, Agent, or Firm*—Larson, Taylor & Hinds

[57] ABSTRACT

An acoustic antenna comprises a support, an acoustic reflector supported by the support and a plurality of acoustic/electrical transducers arranged forwardly of said acoustic reflector to cooperate with the reflector. The acoustic/electrical transducers are arranged at different distances from the reflector thus to be operative at different acoustic frequencies. The transducers are provided with sensitivity compensation means for rendering the transducers less sensitive the further the distance of the transducers from the reflector. The signals of the transducers are combined to render the band width of the antenna relatively wide.

12 Claims, 6 Drawing Figures

ACOUSTIC ANTENNA

BACKGROUND OF THE INVENTION

The present invention relates to acoustic antennae equipped with reflectors.

The technical field of the invention is that relating to the construction of such antennae, particularly but not exclusively receiving antennae of sonar devices (underwater ultrasonic direction finders).

Hitherto the receiving antenna of a sonar device has conventionally comprised rows of hydrophones disposed on an acoustically transparent support. In order to improve the directivity of sonar antennae, antennae have been constructed which are equipped with a reflector disposed rearwardly of the hydrophones and permitting suppression of the image lobes. However, such an antenna has a degree of sensitivity which varies as a function of frequency, in such manner that the pass band of the antenna is relatively narrow, i.e. of the order of one octave and a half.

The reflectors employed in submarine acoustics are made from materials having an acoustic impedance which is very different from that of water. These reflectors belong either to the category of hard reflectors, (for example metal reflectors) the impedance of which is several times higher than that of water, or to the category of soft reflectors the impedance of which is very much lower than that of water. Most frequently in submarine acoustics there are employed soft reflectors which have high acoustic impedance rupture or difference with respect to water and thus enhanced reflecting power.

In the following discussion, a description will be given more especially of an antenna comprising a soft reflector and pressure-sensitive hydrophones, this being the most frequently employed arrangement. However, this selection implies no kind of limitation of the invention. The invention may equally well be applied to an antenna comprising a hard reflector and velocity-sensitive hydrophones, for example hydrophones having flexing blades.

Plane acoustic waves of wavelength $\lambda$, reflected on a soft reflector, give rise forwardly of the reflector to stationary pressure waves which comprise a node on the surface of the reflector and a first antinode at distance $\lambda/4$ from the reflector. The hydrophones generally employed with such a reflector are pressure sensitive, and if they are all disposed at the same distance d forwardly of the reflector there is obtained maximum sensitivity for wavelength $\lambda_o=4d$ and a pass band, centred on $\lambda_o$, the width of which is substantially equal to one octave and a half. The small width of the pass band reduces the importance of this type of antenna equipped with a reflector.

An antenna comprising a row of hydrophones all disposed at the same distance d1 forwardly of a reflector has a maximum sensitivity for a pre-determined frequency $f1=V/\lambda 1=V/4d1$, V being the velocity of sound in water, i.e. approximately 1,500 meters per second. Thus it would appear to be logical, in order to increase the width of the pass band of the antenna, to construct the antenna with a plurality of rows of hydrophones disposed at distances d1, d2 . . . di forwardly of the reflector, and to simply provide the sum of the signals captured by all the hydrophones located in each plane perpendicular to the reflector surface. However, by proceeding in this manner, no substantial broadening of the pass band is obtained.

SUMMARY OF THE INVENTION

It is the object of the present invention to provide a wider pass band for an acoustic antenna equipped with a reflector.

According to the invention there is provided an acoustic antenna comprising:

a support;

an acoustic reflector supported by said support;

a plurality of acoustic/electrical transducers arranged forwardly of said acoustic reflector to cooperate therewith, said acoustic/electrical transducers being disposed at respective different distances from said acoustic reflector in a plane substantially perpendicular thereto;

sensitivity compensation means for rendering the relative sensitivities of said acoustic/electrical transducers such that the or each acoustic/electrical transducer which is more distant from said acoustic reflector than at least one other of said acoustic/electrical transducers has a lower sensitivity than said at least one other acoustic/electrical transducer; and signal combining means coupled to said acoustic-/electrical transducers to combine the signals thereof to provide a relatively wide pass band for said acoustic antenna.

In a simple embodiment the antenna may comprise single acoustic/electrical transducers arranged in a single plane perpendicular to the reflector. In a more complex embodiment, however, there may be a plurality of rows of single acoustic/electrical transducers to provide a plurality of such planes perpendicular to the reflector and containing transducers at different distances from the reflector. In an even more complex embodiment, such as will be described hereinafter with reference to the drawings, the acoustic/electrical transducers may be arranged in respective columns, these columns themselves being arranged in rows parallel to the reflector.

According to one development an antenna according to the invention comprises, for the transducers or columns in the or each plane perpendicular to the surface of the reflector, sensitivity compensation means in the form of voltage dividers connected to the outputs of the respective transducers or columns. The dividing coefficients of the voltage dividers increase with the distance relative to the surface of the reflector, and the signal combining means connect in parallel the outputs of the voltage dividers for the respective plane.

Preferably, the or each plane perpendicular to the surface of the reflector comprises two columns of hydrophones and a voltage divider connected to the column furthest from the reflector, which divides the voltage emerging from each column by a factor in the range 3 to 10.

According to a further embodiment, a receiving antenna according to the invention comprises, forwardly of the reflector, stacks of piezoelectric plates each of which stacks forms a pair of single dissymetrical hydrophones in which the hydrophone furthest from the reflector has the lowest sensitivity, the signal combining means connecting in parallel the outputs of the two hydrophones of each pair.

In this further embodiment each stack may be electrically separated into two portions of unequal length by a common electrode. In this case the stack portion situated on the reflector side is the longer, thus to be more sensitive.

Alternatively, each stack could be divided electrically into two portions of equal length by a common electrode and the stack interposed between two acoustic horns having unequal surfaces and masses. In respect of equal masses, the surface of the acoustic horn which is nearer or turned towards the reflector would be the larger.

A preferred embodiment of the invention provides a novel acoustic receiving antenna equipped with a reflector, preferably a soft reflector, the antenna having a widened pass band extending over a plurality of octaves, for example between 3 Kc/s and 15 Kc/s, this being a useful band for an antenna of a sonar device employed in submarine acoustics.

For example, a receiving antenna could comprise pairs of hydrophones located one 3 cm forwardly of the reflector and the other 10 cm forwardly of the reflector. The sensitivity of the latter would be compensated to be three to ten times lower than that of the first hydrophone. This antenna could have a pass band, evaluated at −3db of the maximum sensitivity, which extends over the frequencies comprised in the range between 4 Kc/s and 15 Kc/s.

Theoretical study of the overall sensitivity of hydrophone couples disposed at pre-determined distances forwardly of a reflector (on varying the sensitivity ratio of the two hydrophones) completely confirms the experimental results.

It is readily effected (and not very costly) to produce an antenna according to the invention comprising stacks of piezoelectric plates constituting pairs of dissymetrical hydrophones the sensitivities of which are different, either by interposing in the stack an electrode common to the two hydrophones which is not located at the centre of the stack, or by disposing the stack between two horns, or between a horn and a counter-mass, the smaller horn or the counter-mass being disposed at the side furthest from the reflector.

BRIEF DESCRIPTION OF THE DRAWINGS

For a better understanding of the invention and to show how the same may be carried into effect, reference will now be made, by way of example, to the accompanying drawings in which.

DETAILED DESCRIPTION OF THE DRAWINGS

Figure 1:
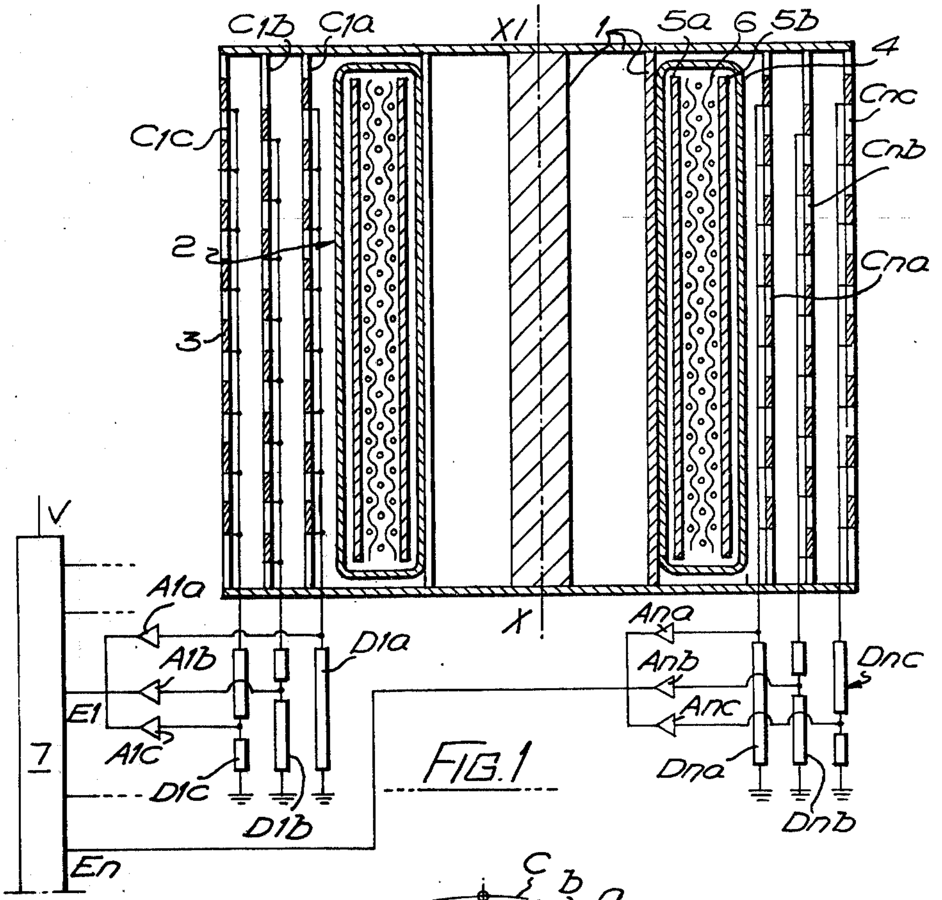
FIGS. 1 and 2 are axial and transverse cross sections through a first embodiment of an antenna according to the invention.
Figure 2:
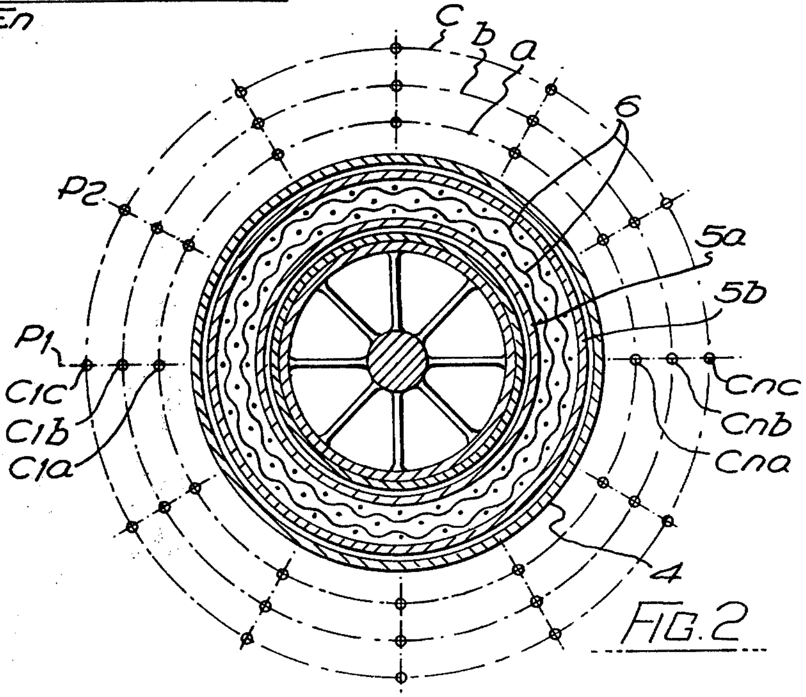

FIGS. 1 and 2 show a sonar receiving antenna having the shape of a vertical cylinder of axis x–x1. The said antenna comprises a support 1 which carries an acoustic reflector 2 surrounding the support 1.

Disposed forwardly of the reflector 2 are columns of hydrophones such as C1a, C1b, C1c. Each column comprises a pre-determined number of hydrophones 3 (for example eight) and the latter may be vertically offset from one column to another as shown in FIG. 1.

The columns of hydrophones are located in vertical planes P1, P2 . . . Pn, at the points of intersection of these planes with cylindrical surfaces a, b, c shown in dotted line in FIG. 2. Thus the surfaces a, b, c correspond to rows of columns of hydrophones.

In other embodiments the antenna could have a non-cylindrical shape, for example a curved or plane shape. In all cases the planes P1, P2 . . . Pn are planes extending from the reflector 2 and perpendicular to the surface of the reflector 2, and the surfaces a, b, c are surfaces parallel to the surface of the reflector 2.

The reflector is, preferably, a soft reflector of a type which resists high hydrostatic pressures. It comprises an external envelope 4 which is deformable and fluid-tight and which imprisons air or a gas. Disposed internally of the said envelope are two rigid plates 5*a* and 5*b* which are parallel to each other and which have two cylindrical surfaces in the case of FIGS. 1 and 2. The said two plates 5*a* and 5*b* are maintained spaced apart by layers of gauze or mesh (or grating) 6, formed by intersecting filaments, stacked between the two plates. Such an acoustic reflector resists high hydrostatic pressures and it maintains good reflecting power under pressures of the order of 60 bars.

The illustrated antenna is for example a receiving antenna of a panoramic sonar device comprising a device 7 for forming listening channels, for example a delay line emitting signals V corresponding to the listening channels. Conventionally, such an antenna would comprise a single row of columns of hydrophones situated at the same distance relative to the axis x–x1.

All the hydrophones of one and the same column receive signals whch are substantially in phase and they are connected in parallel to an input of the device 7 through intermediary of switches or multiplexers which permit the successive formation of the various listening channels.

The presence of the reflector 2 produces the result that an antenna comprising a single row of hydrophone columns located at a distance d forwardly of the reflector has sensitivity maxima corresponding to wavelengths $\lambda=4d$, $\lambda 1=4d/3$ . . . $\lambda n=4d/(2n+1)$ and to frequencies fo V/4d, fl=3fo . . . , fn=(2n+1) fo.

The sensitivity curve of such an antenna, as a function of the frequency, exhibits maxima for the frequencies mentioned hereinabove. The pass band at −3db of such an antenna is of the order of one octave and a half, this being inadequate for a passive sonar antenna intended to capture noises which are within a frequency range covering approximately three octaves.

The described and illustrated antenna makes it possible to avoid this disadvantage. It comprises, in each of the axial planes Pn, a plurality of columns of hydrophones, for example three columns Cna, Cnb, Cnc. The hydrophones of each column are interconnected in parallel and the output of each column is connected on a voltage divider, respectively Dna, Dnb, Dnc. The dividing coefficients of these voltage dividers are higher in proportion as the columns to which they are connected are further from the reflector 2. For example, the dividers Dna do not divide at all the voltages supplied by the columns Cna; the dividers Dnb supply voltages equal to 0.3 times the voltages supplied by the columns Cnb; and the dividers Dnc supply voltages equal to 0.1 times the output voltages of the columns Cnc. The output of each voltage divider is connected to the input of a pre-amplifier, respectively Ala, Alb, Alc and Ana, Anb, Anc, serving as impedance adaptors. The outputs of the three amplifiers corresponding to the three columns disposed in one and the same plane Pn are connected in parallel to one of the inputs E1, . . . En of the device 7 for forming listening channels.

As an alternative to utilising voltage dividers, it is possible to reduce the sensitivity of the columns furthest from the reflector 2 by utilizing amplifiers Ana, Anb, Anc, the gain of which decreases from the center of the antenna towards the periphery thereof, thus permitting suppression of the voltage dividers.

Of course, other equivalent electronic means may be employed for reducing the sensitivity of the hydrophones spaced furthest away from the reflector 2, and the invention is extended to all these equivalent means, such as are well known to the person skilled in the art.

Figure 3:
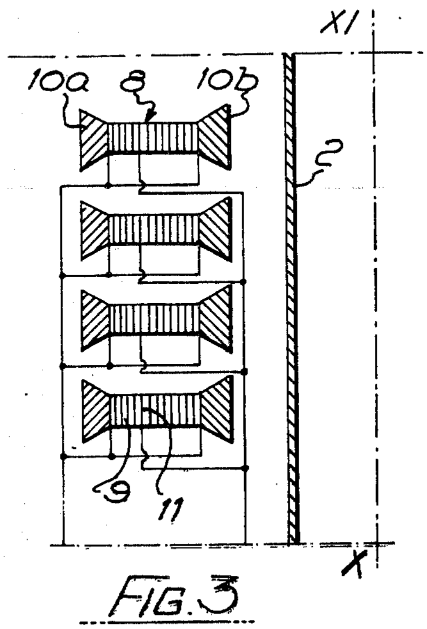
FIGS. 3 and 4 are partial axial sections of variants of antennae according to the invention.
Figure 4:
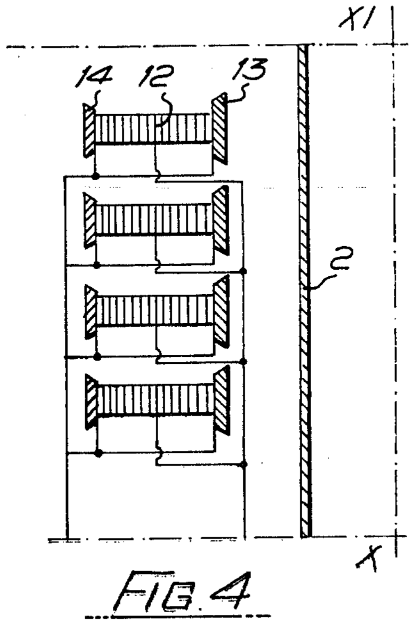

FIGS. 3 and 4 show partial half-sections of variants of embodiment of an antenna according to the invention. There can be seen on these sections the axis x–xl of the antenna and the external face of the acoustic reflector 2. Forwardly of the reflector 2, there are disposed columns of pairs of hydrophones 8. These hydrophones are of the type made up of stacks of piezoelectric plates 9 disposed between an acoustical horn (receiver) and a counter-mass, or between two horns.

Referring to FIG. 3, each pair of hydrophones comprises two equal horns 10*a* and 10*b* and an intermediate electrode 11 which is not disposed at the center of the stack, such that the stack portion located nearer the reflector 2 is the longest. Thus in each pair of hydrophones that hydrophone which is directed towards the reflector 2 has the highest sensitivity.

Alternatively, instead of a stack of plates it is possible to employ pairs of hydrophones comprising only two plates of unequal thickness.

The outputs of the two hydrophones of each pair thereof are connected in parallel. The outputs of all the pairs of hydrophones of each column are also connected in parallel on an input of the device 7 for the formation of listening channels.

As a variant, the horns may be omitted.

FIG. 4 shows a further embodiment in which the common electrode 12 is disposed in the centre of the piezoelectric plates of each pair of hydrophones. In this case the different sensitivity is obtained employing pairs of hydrophones comprising a horn 13 and a counter-mass 14, the horn 13 being directed towards the reflector 2 in such manner that the hydrophone furthest from the reflector 2 has a lower degree of sensitivity.

Alternatively it is possible to employ pairs of hydrophones comprising two horns 13 and 14 of identical mass, the horn 13 having a surface which is larger than that of the counter-mass 14.

As before, the outputs of the two hydrophones of each pair are connected in parallel, and the outputs of all the pairs of hydrophones of one and the same column are equally connected in parallel.

The variants shown in FIGS. 3 and 4 are examples of embodiment wherein the sensitivity compensation means provide pairs of dissymetrical hydrophones. These are extremely simple modes embodiment to construct. FIG. 1 on the other hand shows a case wherein the sensitivity compensation means are electronic means. FIG. 1 is an embodiment which is slightly more complex than those shown in FIGS. 3 and 4, but which employs more than two rows of hydrophones and thus achieves a wider pass band.

Figure 5:
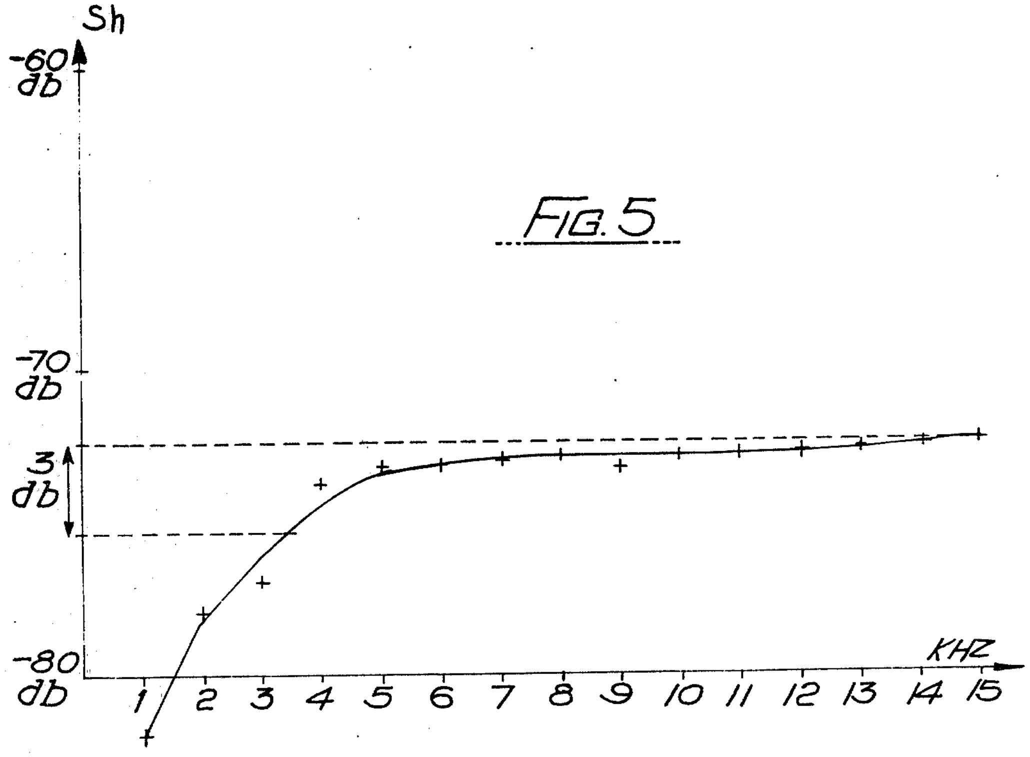
FIG. 5 is a graph of the sensitivity of an antenna according to the invention.

FIG. 5 shows sensitivity measurements Sh of an antenna according to FIG. 4, wherein the free face of the horn 13 is located at 3 cm from the surface of the reflector 2 and the free face of the counter-mass 14 at 10 cm from the reflector 2. Shown along the abscissa is the frequency in kiloherz, and shown along the ordinate is the sensitivity in db. It will be seen that the curve obtained is extremely flat and that the pass band at −3db extends from 3.5 kiloherz to 15 kiloherz: i.e. over two octaves.

Figure 6:
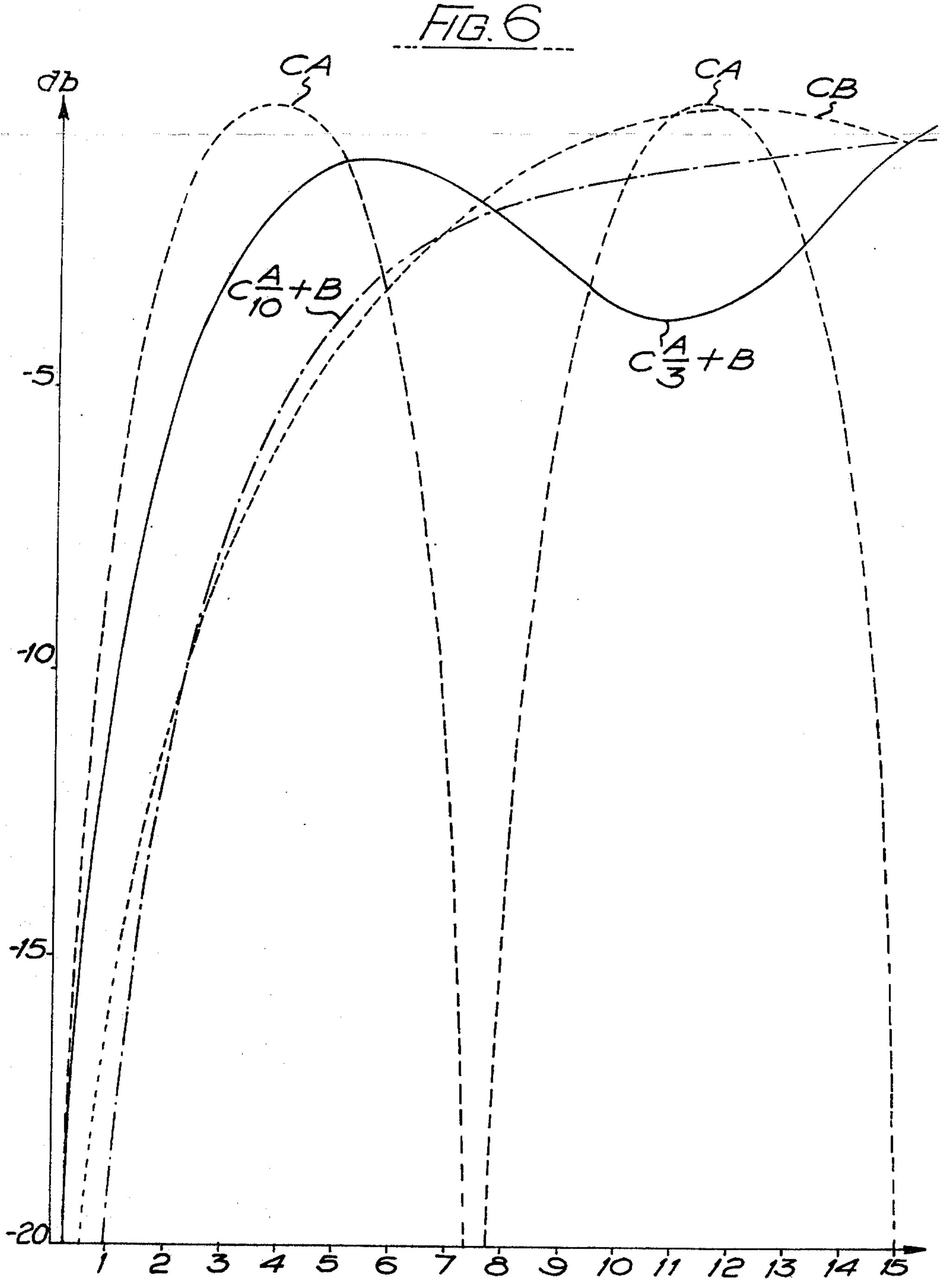
FIG. 6 shows theoretical curves of sensitivity variation.

FIG. 6 shows the theoretical curves of variation of sensitivity. On the abscissa is plotted the frequency in kiloherz, and on the ordinate the acoustic pressure. The pressure scale represents, close to one constant, the sensitivity of a hydrophone disposed forwardly of a reflector. It will be assumed that the sensitivity of a single hydrophone remains constant over the entire width of the band.

The curve CA, in dashed line, illustrates the theoretical sensitivity variations of a hydrophone A disposed 10 cm forwardly of a reflector. It will be seen that this curve has two maxima, one for a frequency 3.8 of kiloherz, and the other for three times this frequency, i.e. 11.4 Kc/s.

Curve CB represents the theoretical sensitivity of a hydrophone B disposed 3 cm forwardly of a reflector. The sensitivity is a maximum for a frequency equal to approximately 12 kiloherz. If one simply sums the pressures captured or sensed by the two hydrophones, given the phase shifts, there is obtained a resulting curve of dome shape without any widening of the pass band.

The curve in full line represents the theoretical variation of the overall sensitivity obtained by summing the voltage supplied by the hydrophone B and a third of the voltage supplied by the hydrophone A. It will be seen that the −3db pass band ranges between 2.5 kiloherz and 14.5 kiloherz.

The curve in dot-dash (or broken) line represents the overall sensitivity obtained by adding the voltage supplied by the hydrophone B and a tenth of the voltage supplied by the hydrophone A. There is obtained a curve which is flatter than the preceding one, but the band width is less extensive in the low frequencies.

The theoretical curves obtained by adding to voltage B a fraction of voltage A varying between A/10 and A/3 are intermediate the two curves C(A/3+B) and C(A/10+B).

These theoretical curves confirm the experimental results and show that there is in fact obtained a pass band which is widened by adding the voltages supplied by a plurality of hydrophones disposed in the same plane perpendicular to the reflector, provided that there is taken-off only a fraction of the voltages supplied by the hydrophones furthest from the reflector, this fraction ranging between ⅓ and 1/10 in the case of two reflectors.

Of course, without exceeding the scope of the invention, the various elements which constitute the antennae described hereinabove by way of example may be replaced by equivalent elements performing the same functions.

I claim:

1. An acoustic antenna having a widened pass band extending over a plurality of octaves, said antenna comprising:

a support;

an acoustic reflector, having a reflecting surface, enveloping said support and supported thereby;

a plurality of piezoelectric transducers arranged forwardly of said acoustic reflector in the direction of reception for cooperating therewith, said transducers being disposed on a plurality of columns located at respective different distances from said acoustic reflector, at the respective intersections of a plurality of surfaces extending parallel to said reflecting surface with a plurality of planes extending perpendicular to said reflecting surface;

sensitivity compensation means for reducing the relative sensibilities of said transducers so that the sensitivity of each transducer spaced more distant from the reflector is reduced relative to the sensitivity of each transducer spaced closer to said reflector; and signal combining means for forming listening channels, said signal combining means having a plurality of inputs and the outputs of all said sensitivity compensations means corresponding to all the columns of transducers located in each plane perpendicular to said reflecting surface being connected in parallel to the said inputs of said signal combining means.

2. An acoustic antenna as claimed in claim 1, wherein in said plane and at each of said different distances from said acoustic reflector, there is a column of said transducers all at the same distance from said acoustic reflector, said signal combining means is coupled to each respective one of said columns, and said sensitivity compensation means renders the relative sensitivities of said columns such that each column which is more distant from said acoustic reflector than at least one other of said columns has a lower sensitivity than said at least one other column.

3. An acoustic antenna as claimed in claim 2, and comprising a plurality of rows of said columns, said rows being at said respective different distances from said acoustic reflector and said columns being arranged on planes extending from said acoustic reflector and perpendicular thereto, there being for those of said columns in each of said planes a said signal combining means coupled to each respective one of said columns in the respective plane, and said sensitivity compensation means providing that each column which is more distant from said acoustic reflector than at least one other of said columns has a lower sensitivity than said at least one other column.

4. An acoustic antenna as claimed in claim 1, and comprising a plurality of rows of said transducers, said rows being at said respective different distances from said acoustic reflector and said transducers being arranged on planes extending from said acoustic reflector and perpendicular thereto, there being for those of said transducers in each of said planes a said signal combining means coupled to each respective one of said transducers in the respective plane, and said sensitivity compensation means providing that each column which is more distant from said acoustic reflector than at least one other of said columns has a lower sensitivity than said at least one other column.

5. An acoustic antenna as claimed in claim 1, wherein said sensitivity compensation means comprises for said transducers in said plane at least one voltage divider for reducing the output of each transducer which is more distant from said acoustic reflector than said at least one other of said transducers.

6. An acoustic antenna as claimed in claim 2, wherein said sensitivity compensation means comprises for said columns in said plane at least one voltage divider for reducing the output of each column which is more distant from said acoustic reflector than said at least one other of said columns.

7. An acoustic antenna according to claim 5, wherein each said voltage divider divides the voltage emitted from the associated transducer by a factor in the range from 3 to 10.

8. An acoustic antenna as claimed in claim 1, which is a receiving antenna wherein each said piezoelectric transducer is a hydrophone and wherein in said plane the piezoelectric transducers at two adjacent ones of said different distances are a pair of hydrophones provided by the same stack of piezoelectric plates.

9. An acoustic antenna according to claim 8, wherein said sensitivity compensation means comprises for each said pair of hydrophones a common electrode which electrically separates said stack into two lengths which are disposed one after another with respect to said acoustic reflector, the length which is nearer said acoustic reflector being longer than the other length thereby to provide the hydrophone which is nearer said acoustic reflector with a sensitivity greater than the other hydrophone in said pair.

10. An acoustic antenna as claimed in claim 8, wherein said sensitivity compensation means comprises, for each said pair of hydrophones, two acoustic horns, for the two respective hydrophones, having unequal surfaces or masses.

11. An acoustic antenna as claimed in claim 10, wherein in each said pair of hydrophones the surface of the acoustic horn which is nearer said acoustic reflector is greater than the surface of the other acoustic horn.

12. An acoustic antenna as claimed in claim 1, intended to withstand considerable pressure when in use, wherein said acoustic reflector comprises a deformable and fluid tight envelope filled with gas and containing two rigid parallel plates separated by a stack of meshworks prepared from intersecting filaments.

* * * * *